(12) United States Patent
Sun

(10) Patent No.: US 7,362,518 B2
(45) Date of Patent: Apr. 22, 2008

(54) SMALL SIZED WIDE ANGLE LENS

(75) Inventor: Wen-Hsin Sun, Tu-Cheng (TW)

(73) Assignee: Hon Hai Precision Industry Co., Ltd., Tu-Cheng, Taipei, Hsien (TW)

( * ) Notice: Subject to any disclaimer, the term of this patent is extended or adjusted under 35 U.S.C. 154(b) by 240 days.

(21) Appl. No.: 11/198,102

(22) Filed: Aug. 5, 2005

(65) Prior Publication Data

US 2006/0061882 A1   Mar. 23, 2006

(30) Foreign Application Priority Data

Sep. 17, 2004   (CH)   .................. 2004 1 0051566

(51) Int. Cl.
*G02B 9/12* (2006.01)
(52) U.S. Cl. .................. 359/753; 359/716; 359/784; 359/785
(58) Field of Classification Search ................ 359/716, 359/784, 753, 785
See application file for complete search history.

(56) References Cited

U.S. PATENT DOCUMENTS 4,620,775 A    11/1986   Fujioka 6,724,547 B2 *  4/2004   Sato ............................ 359/785
6,795,253 B2 *  9/2004   Shinohara .................... 359/716
2004/0150893 A1 * 8/2004  Shinohara .................... 359/785

FOREIGN PATENT DOCUMENTS

JP      2004212467 A  *  7/2004

* cited by examiner

*Primary Examiner*—Scott J. Sugarman
*Assistant Examiner*—James R Greece
(74) *Attorney, Agent, or Firm*—Jeffrey T. Knapp

(57)   ABSTRACT

A wide angle lens includes, in order from an object side, a first positive convex lens element, a second concavo-convex negative lens element, and a third lens element. The first lens element is made of an optical glass and defines a first convex aspheric surface on the object side and a second plane aspheric surface. The second lens element is made of an optical plastic and defines a third concave aspheric surface on the object side and a fourth convex aspheric surface. The third lens element is made of an optical plastic and defines a fifth high-aperture size convex aspheric surface on the object side and a sixth wave-shaped aspheric surface. Each of the lens elements is symmetrically disposed about an optical axis of the lens. The lens is compact and capable of covering total field angle of up to about 70 degrees.

16 Claims, 3 Drawing Sheets

SMALL SIZED WIDE ANGLE LENS

BACKGROUND OF THE INVENTION

1. Field of the Invention

The present invention relates generally to a wide angle lens for portable electronic devices such as mobile phones and, more particularly, to a very compact wide angle lens having an angle of view up to about 70 degrees.

2. Description of the Related Art

With the ongoing development of microcircuitry and multimedia technology, digital cameras are now in widespread use. High-end portable electronic devices such as mobile phones and PDAs (Personal Digital Assistants) are being developed to be increasingly multi-functional. Many of these portable electronic devices are now equipped with a digital camera. Conventionally, an angle of view of a lens for digital cameras incorporated in portable electronic devices is between 50 degrees and 60 degrees. Such digital cameras have a small imaging area, so it can not satisfy some special purposes such as imaging a large area when users snap self-portraits. When a user use such a digital camera to snap self-portraits, the captured image area is limited to his/her face by a short image distance and the narrow angle lens of the digital camera.

A wide angle lens has already been disclosed which achieves an angle of view of 70 degrees or more, including, successively from an object side, a first lens L.sub.1 composed of a double convex positive lens, a second lens L.sub.2 composed of a double concave negative lens, and a third lens L.sub.3 composed of a meniscus positive lens with a convex surface thereof directed toward an image side. In this case, though the angle of view of the lens exceeds 70 degrees, the full length of the lens is longer than 21.8 mm. Therefore, at such a length, the lens is too large to be equipped in the portable electronic devices. In addition, as the maximum aperture of the lens is f/8, the camera equipped with the lens needs an additional flash to provide enough light, which would yet further augment the size of the portable electronic device.

Accordingly, what is needed is a very compact wide angle lens having an angle of view up to about 70 degrees.

SUMMARY OF THE INVENTION

In a preferred embodiment, a wide angle lens includes, in order from an object side, a first positive convex lens element, a second concavo-convex negative lens element, and a third lens element. The first lens element is made of optical glass and defines a first convex aspheric surface on the object side and a second aspheric surface approximating a plane. The second lens element is made of an optical plastic and defines a third concave aspheric surface on the object side and a fourth convex aspheric surface. The third lens element is made of optical plastic and defines a fifth high-aperture size convex aspheric surface on the object side and a sixth waveshaped aspheric surface. Each of the lens elements is symmetrically disposed about an optical axis of the lens.

Other advantages and novel features will become more apparent from the following detailed description of preferred embodiment when taken in conjunction with the accompanying drawings.

DETAILED DESCRIPTION OF THE PREFERRED EMBODIMENT

Figure 1:
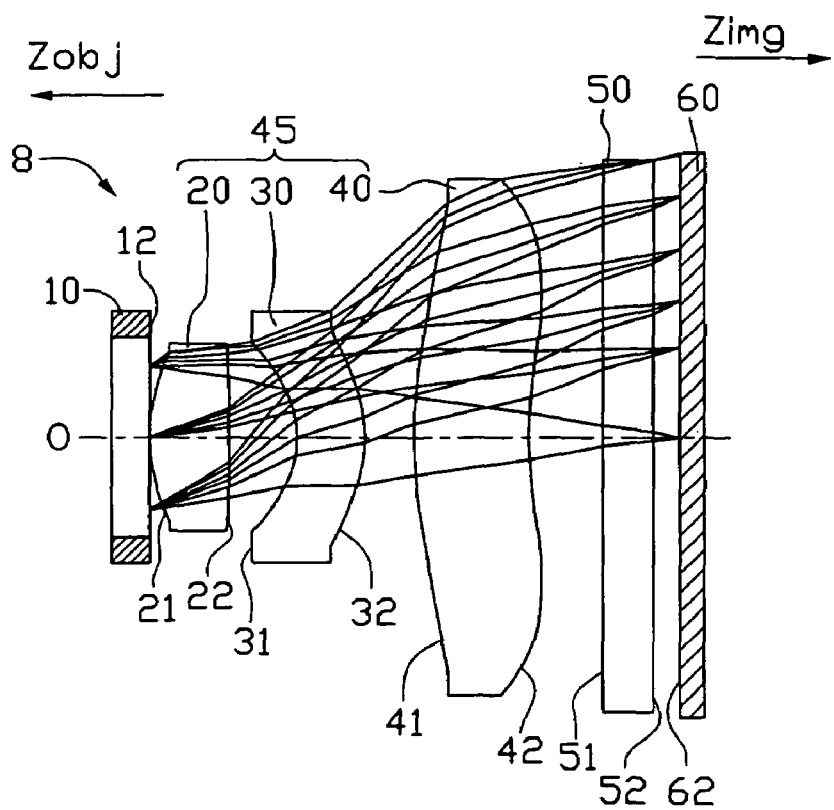
FIG. 1 is a schematic, side cross-sectional view of a lens for a digital camera, according to a preferred embodiment of the present invention.

Referring to FIG. 1, a module 8 for a digital camera of a preferred embodiment includes a diaphragm 10, a first lens element 20, a second lens element 30, a third lens element 40, an optical board 50, and an image sensor 60, which are consecutively arranged in that order from an object side designated as "$Z_{obj}$" to an image side designated as "$Z_{img}$". An "O" line represents an optical axis of the lens. The first lens element 20, second lens element 30, and third lens element 40 together generally define a wide angle lens 45. The module 8 advantageously has total length of less than about 8 mm, and, in the embodiment shown, the module length is less than about 6 mm (5.85962 mm).

The diaphragm 10 includes a diaphragm plane 12, which faces the first lens element 20. The diaphragm 10 is the first component to receive light rays when the lens element 20 is used. Therefore, it is convenient to control the light rays using the diaphragm 10.

The first lens element 20 is a positive convex aspheric lens with its convex surface on the object side and includes a convex first surface 21 and a second surface 22 approximating a plane. The first lens element 20 is made of optical glass. A refractive index designated as "n" and a dispersion coefficient designated as "v" of the first lens element 20 need to satisfy the following requirements: $1.55 < n < 1.7$, $50 < v < 60$. The first lens element 20 is preferably made from L-LAL12. The refractive index of L-LAL12 is 1.6779, and its dispersion coefficient is 54.9.

The second lens element 30 is a negative concavo-convex aspheric lens with its concave surface on the object side and includes a concave third surface 31 and a convex fourth surface 32. The second lens element 30 is made of an optical plastic. A refractive index and dispersion coefficient of the second lens element 30 need to satisfy the following requirements: $1.58 < n < 1.6$, $29 < v < 35$. The second lens element is preferably made from POLYCARB (hereinafter "PC"). The refractive index of PC is 1.58547, and its dispersion coefficient is 29.909.

The third lens element 40 is a positive aspheric lens and includes a fifth aspheric surface 41 with a high-aperture on the object side and a sixth aspheric surface 42 being waveshaped. The third lens element 40 is made of an optical plastic. A refractive index and dispersion coefficient of the third lens element 40 need to satisfy the following requirements: $1.49 < n < 1.55$, $55 < v < 60$. The third lens element 40 is preferably made from ZEO-E48R. The refractive index of ZEO-E48R is 1.53116, and its dispersion coefficient is 56.0414.

The optical board 50 is made of glass and includes a first plane 51 on the object side and a second plane 52 on the image side. The optical board 50 is preferably made from B270. The refractive index of B270 is 1.52308, and its dispersion coefficient is 58.5714.

The image sensor 60 is located at the image side of the optical board 50. The image sensor 60 includes an image plane 62 on the object side. The optical board 50 can protect the image plane 62, so that dust or other contamination does not reach the image plane 62. The image sensor 60 is usually a Charge Coupled Device (hereinafter "CCD") or a Complementary Metal Oxide Semiconductor (hereinafter "CMOS"). If the image sensor 60 is used in a digital camera of a mobile phone, the image sensor 60 is usually a CMOS for cost reasons. A pixel size of the COMS of the present embodiment is 3.6 μm, and a resolution of the CMOS is about 1280×1024 pixels.

The first lens element 20, which is made from an optical glass, is less easily scraped or abraded. At least one surface of the first lens element 20 and the optical board 50, which is also made of glass, is coated an Infrared-cut (hereinafter "IR-cut") coating in order to filter infrared rays and hence improving image quality.

Detailed structural parameters of the lens of the preferred embodiment are shown in FIG. 1 and provided in Table 1. R and d are shown in millimeters. The surfaces are identified according to the corresponding drawing reference, from the object side to the image side as shown.

TABLE 1

| Surface | Description | R | d | Material | D | k |
|---|---|---|---|---|---|---|
| 12 | Diaphragm | Infinity | 0.03040951 | Air | 1.571181 | 0 |
| 21 | First surface | 2.184347 | 0.8588545 | L-LAL12 | 1.910503 | 0 |
| 22 | Second surface | 10.81372 | 0.7662999 | Air | 2.074914 | 0 |
| 31 | Third surface | −1.22888 | 0.749922 | POLYCARB | 2.074216 | 0 |
| 32 | Fourth surface | −1.500726 | 0.5489361 | Air | 2.736669 | 0 |
| 41 | Fifth surface | 5.441956 | 1.257498 | ZEO-E48R | 5.240696 | 0 |
| 42 | Sixth surface | 4.590265 | 0.8093014 | Air | 5.700535 | 0 |
| 51 | First plane | Infinity | 0.5563947 | B270 | 6.024315 | 0 |
| 52 | Second plane | Infinity | 0.2820029 | Air | 6.129262 | 0 |
| 62 | Image plane | Infinity | | | 6.296222 | 0 |

Where:

z is the surface sag;

c=1/R, where R is the curvature radius of the surface's optical center;

k is the conic constant;

r is the distance from the optical axis; and $a_1$, $a_2$, $a_3$, $a_4$, $a_5$, and $a_6$ are the aspheric coefficients.

The aspheric coefficients $a_1$, $a_2$, $a_3$, $a_4$, $a_5$, and $a_6$ are given by Table 2:

TABLE 2

| Surface | Description | $a_1$ | $a_2$ | $a_3$ | $a_4$ | $a_5$ |
|---|---|---|---|---|---|---|
| 21 | First surface | 0 | −0.0030892391 | −0.0071110815 | 0.0011161245 | −0.0037678149 |
| 22 | Second surface | 0 | −0.025799536 | −0.022383266 | −0.012802254 | −0.0015873624 |
| 31 | Third surface | 0 | −0.0032416416 | 0.047130855 | −0.0040239483 | 0.0080725451 |
| 32 | Fourth surface | 0 | 0.03585162 | 0.032241911 | 0.0048140776 | 0.0044346914 |
| 41 | Fifth surface | 0 | −0.012922311 | 0.0014449276 | −0.00006741227 | −0.0000010470078 |
| 42 | Sixth surface | 0 | −0.02613585 | 0.0012729715 | −0.000049252884 | −0.0000016094932 |

Where:

R is the curvature radius of the surface's optical center;

d is the thickness of the lens element or space between the adjacent surfaces of two adjacent lens elements;

D is the effective aperture of the surface; and k is the conic constant.

The aspheric surfaces are the surfaces 21, 22, 31, 32, 41 and 42, and be the following equation:

$$z = \frac{cr^2}{1 + \sqrt{1 - (1+k)c^2 r^2}} + a_1 r^2 + a_2 r^4 + a_3 r^6 + a_4 r^8 + a_5 r^{10} + a_6 r^{12} \cdots$$

The effective focal length of the lens is 4.399 mm in air, and the maximum aperture is f/2.8. The angle of view is 70.35 degrees. The lens is well suited for use with state-of-the-art digital sensors having a resolution about 1280×1024 pixels.

The performance of the lens of the preferred embodiment is illustrated in FIG. 2 through FIG. 5.

Figure 2:
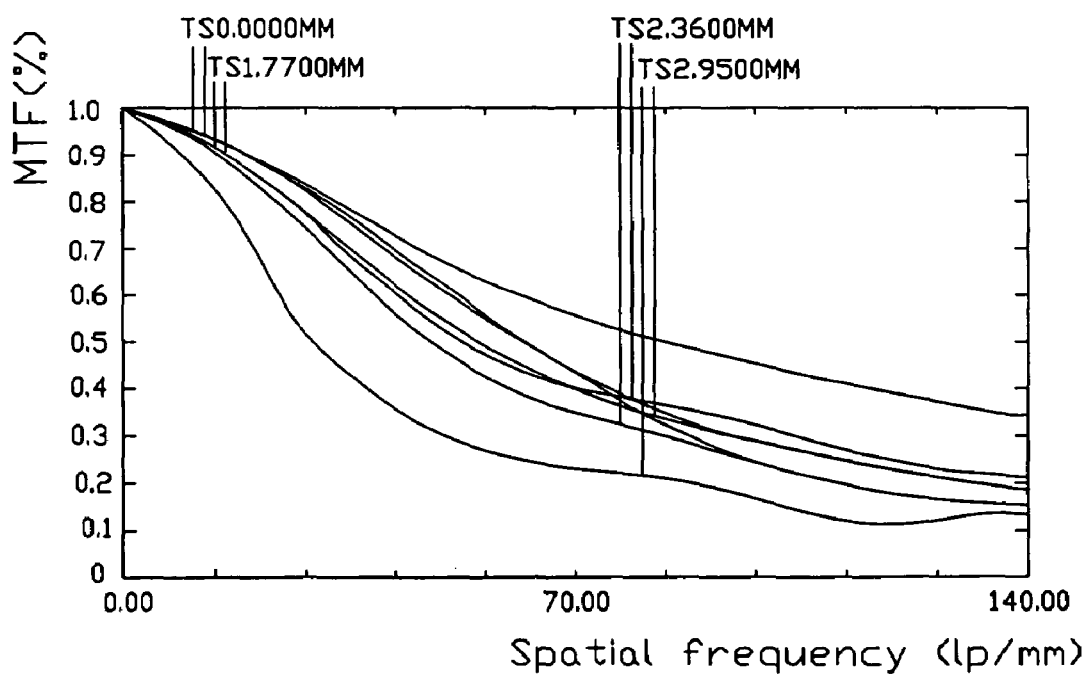
FIG. 2 is a graph of Modulation Transfer Function (MTF) of the lens of FIG. 1.

Referring to FIG. 2, Modulation Transfer function (hereinafter "MTF") is the scientific means of evaluating the fundamental spatial resolution performance of an imaging system. A maximal image height, corresponding to a 1.0 field of view, is defined as the half of the length of a diagonal of the effective area of the image sensor 60 which is rectangular. In order to capture the spatial frequencies according to the different image height, measuring the MTFs on the 1.0 field of view, a 0.8 field of view, a 0.6 field of view and a 0 field of view. In the preferred embodiment of the lens, the half of the length of the diagonal of the image sensor 60 is 2.95 mm. That is to say, the image height of 1.0 field of view is 2.95 mm. Accordingly, the image height of 0.8 field of view is 2.95×0.8=2.36 mm, the image height of 0.6 field of view is 2.95×0.6=1.77 mm, and the image height of 0 field of view is 0 mm which is the center of the image sensor 60. Each curved line represents the performance of the lens. The higher the modulation transfer, the better the preservation of detail by the imaging system. For the lens, it is considered satisfactory for general imaging requirements.

Figure 3:
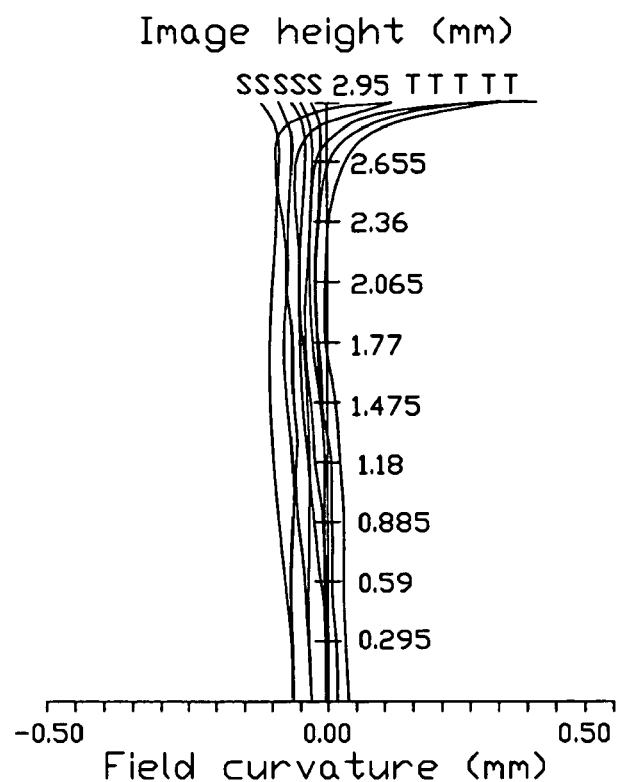
FIG. 3 is a graph of tangential and sagittal field curvatures of the lens of FIG. 1.

Referring to FIG. 3, field curvature represents the curved extents of the image plane when visible light is focused through a lens. Field curvature is very seldom totally eliminated. It is not absolutely necessary to have the best correction. When cost is important, it is often wise to select a more modestly priced configuration, rather than have a high degree correction. For the lens, it can be seen that the tangential and sagittal field curvature is under ±0.2 mm which is considered to be sufficient for general imaging requirements.

Figure 4:
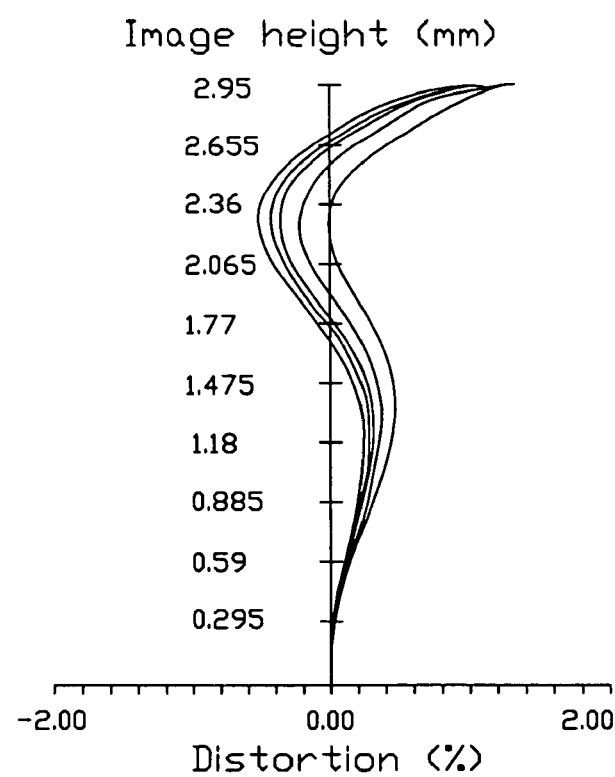
FIG. 4 is a graph of optical distortion of the lens of FIG. 1.

Referring to FIG. 4, distortion represents the inability of a lens to create a rectilinear image of the subject. Distortion does not modify the colors or the sharpness of the image, but rather the shape of the image. The maximum geometric distortion of the lens is typically higher than −0.5%, and lower than 0.5%.

Figure 5:
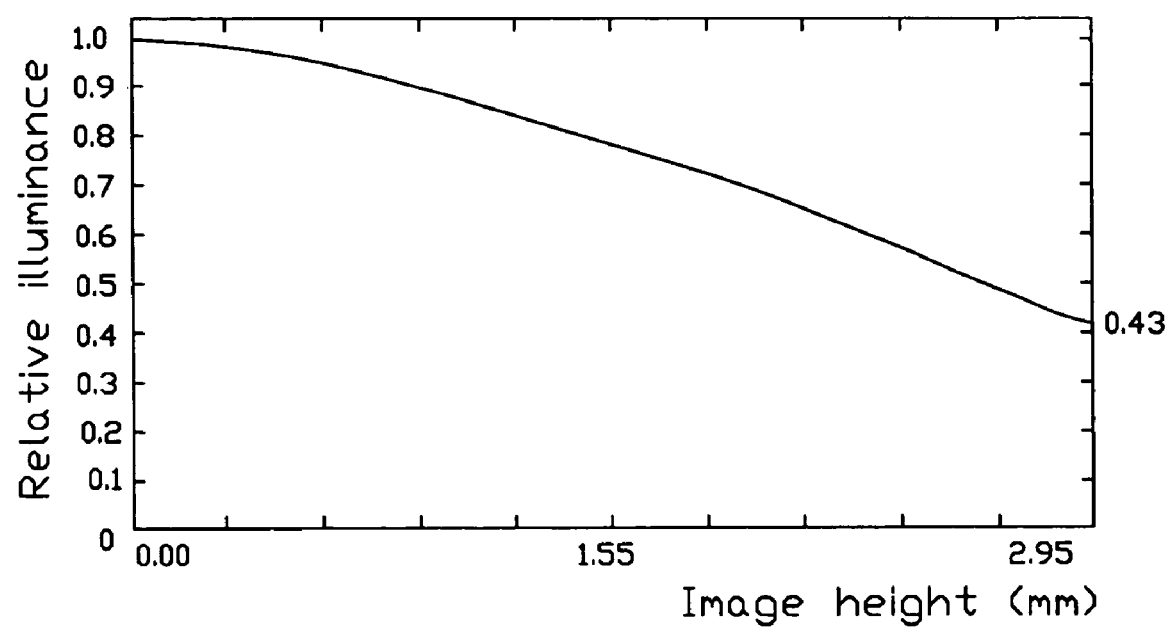
FIG. 5 is a graph of relative illuminance of the lens of FIG. 1.

Referring to FIG. 5, the lowest value of the relative illuminance is about 43%, and it is considered satisfactory for the general requirements of portable electronic devices.

While certain specific relationships, materials and other parameters have been detailed in the above description of preferred embodiments, the described embodiments can be varied, where suitable, within the principles of the present invention. It should be understood that the preferred embodiments have been presented by way of example only and not by way of limitation. Thus the breadth and scope of the present invention should not be limited by the above-described exemplary embodiments but should be defined according to the following claims and their equivalents.

I claim:

1. A wide angle lens having an optical axis, the wide angle lens comprising, in order from an object side:
   a first positive convex lens element made of an optical glass, the first positive convex lens element defining:
      a first convex aspheric surface on the object side; and
      a second aspheric surface approximating a plane;
   a second concavo-convex negative lens element made of an optical plastic, the second concavo-convex negative lens element defining:
      a third concave aspheric surface on the object side; and
      a fourth convex aspheric surface; and
   a third lens element made of an optical plastic, the third lens element defining:
      a fifth high-aperture convex aspheric surface on the object side; and
      a sixth aspheric surface being wave-shaped;
   wherein, each of the lens elements is disposed approximately symmetrically about an optical axis of the lens, and the lens elements statisfy the following data:

| Description | R | d | D | k |
|---|---|---|---|---|
| First surface | 2.184347 | 0.8588545 | 1.910503 | 0 |
| Second surface | 10.81372 | 0.7662999 | 2.074914 | 0 |
| Third surface | −1.22888 | 0.749922 | 2.074216 | 0 |
| Fourth surface | −1.500726 | 0.5489361 | 2.736669 | 0 |

| Description | R | d | D | k |
|---|---|---|---|---|
| Fifth surface | 5.441956 | 1.257498 | 5.240696 | 0 |
| Sixth surface | 4.590265 | 0.8093014 | 5.700535 | 0 | where:
   R is the curvature radius of the surface's optical center;
   d is the thickness of the lens element or space between surfaces of two adjacent lens elements;
   D is the effective aperture of the surface; and
   k is the conic constant,
   wherein the conic constant and the aspheric surfaces of the lens are defined by the equation, $$z = \frac{cr^2}{1 + \sqrt{1-(1+k)c^2r^2}} + a_1 r^2 + a_2 r^4 + a_3 r^6 + a_4 r^8 + a_5 r^{10} + a_6 r^{12} \cdots$$

where:
   z is the surface sag;
   c=1/R, where R is the curvature radius of the surface's optical center;
   k is the conic constant;
   r is the distance from the optical axis; and
   $a_1$, $a_2$, $a_3$, $a_4$, $a_5$, and $a_6$ are the aspheric coefficients; and surface data for the aspheric lenses are as follows:

| Description | $a_1$ | $a_2$ | $a_3$ | $a_4$ |
|---|---|---|---|---|
| First surface | 0 | −0.0030892391 | −0.0071110815 | 0.0011161245 |
| Second surface | 0 | −0.025799536 | −0.022383266 | −0.012802254 |
| Third surface | 0 | −0.0032416416 | 0.047130855 | −0.0040239483 |
| Fourth surface | 0 | 0.03585162 | 0.032241911 | 0.0048140776 |
| Fifth surface | 0 | −0.012922311 | 0.0014449276 | −0.00006741227 |
| Sixth surface | 0 | −0.02613585 | 0.0012729715 | −0.000049252884 |

| Description | $a_5$ |
|---|---|
| First surface | −0.0037678149 |
| Second surface | −0.0015873624 |
| Third surface | 0.0080725451 |
| Fourth surface | 0.0044346914 |
| Fifth surface | −0.0000010470078 |
| Sixth surface | −0.0000016094932. |

2. The wide angle lens as claimed in claim 1, wherein a refractive index 'n' and a dispersion coefficient 'v' of the first lens element respectively satisfy the following requirements: 1.55<n<1.7, 50<v<60.

3. The wide angle lens as claimed in claim 2, wherein a material of the first lens element comprises L-LA12 having a refractive index of 1.6779 and a dispersion coefficient of 54.9.

4. The wide angle lens as claimed in claim 1, wherein a refractive index 'n' and a dispersion coefficient 'v' of the second lens element respectively satisfy the following requirements: 1.58<n<1.6, 29<v<35.

5. The wide angle lens as claimed in claim 4, wherein a material of the second lens element comprises polycarbonate having a refractive index of 1.58547 and a dispersion coefficient of 29.909.

6. The wide angle lens as claimed in claim 1, wherein a refractive index 'n' and a dispersion coefficient 'v' of the third lens element respectively satisfy the following requirements: 1.49<n<1.55, 55<v<60.

7. The wide angle lens as claimed in claim 6, wherein a material of the third lens element comprises ZEO-E48R having a refractive index of 1.53116 and a dispersion coefficient of 56.0414.

8. The wide angle lens as claimed in claim 1, further comprising a diaphragm disposed in front of the first lens element.

9. The wide angle lens as claimed in claim 1, wherein at least one surface of the first lens element is coated with an Infrared-cut coating.

10. The wide angle lens as claimed in claim 1, further comprising a optical board made of optical glass and disposed behind the third lens element.

11. The wide angle lens as claimed in claim 10, wherein the optical board is coated with an Infrared-cut coating.

12. A module for a digital camera, the module including module elements presented consecutively from an object side, the module elements comprising:

a diaphragm;

a lens for the digital camera disposed behind the diaphragm, the lens having an optical axis, the lens comprising:

a first positive convex lens element made of an optical glass, the first positive convex lens element comprising a first convex aspheric surface on the object side and a second aspheric surface approximating a plane;

a second concavo-convex negative lens element made of an optical plastic, the second concavo-convex negative lens element comprising a third concave aspheric surface on the object side and a fourth convex aspheric surface; and a third lens element made of an optical plastic, the third lens element comprising a fifth high-aperture convex aspheric surface on the object side and a sixth aspheric surface being wave-shaped, each of the lens elements being disposed approximately symmetrically about the optical axis of the lens;

an optical board disposed behind the third lens element the optical board including a first board plane and a second board plane, the first board plane facing the third lens element; and an image sensor disposed behind the optical board and facing the second board plane, the image sensor including an image plane;

wherein the module elements satisfy the following data;

| Description | R | d | Material | D | k |
|---|---|---|---|---|---|
| Diaphragm | Infinity | 0.03040951 | Air | 1.571181 | 0 |
| First surface | 2.184347 | 0.8588545 | L-LAL12 | 1.910503 | 0 |
| Second surface | 10.81372 | 0.7662999 | Air | 2.074914 | 0 |
| Third surface | −1.22888 | 0.749922 | POLYCARB | 2.074216 | 0 |
| Fourth surface | −1.500726 | 0.5489361 | Air | 2.736669 | 0 |
| Fifth surface | 5.441956 | 1.257498 | ZEO-E48R | 5.240696 | 0 |
| Sixth surface | 4.590265 | 0.8093014 | Air | 5.700535 | 0 |
| First plane | Infinity | 0.5563947 | B270 | 6.024315 | 0 |
| Second plane | Infinity | 0.2820029 | Air | 6.129262 | 0 |
| Image plane | Infinity | | | 6.296222 | 0 | where:

R is the curvature radius of the surface's optical center;

d is the thickness of the lens element or space between surfaces of two adjacent lens elements;

D is the effective aperture of the surface; and k is the conic constant;

wherein the conic constant and the aspheric surfaces of the lens are defined by the equation;

$$z = \frac{cr^2}{1+\sqrt{1-(1+k)c^2r^2}} + a_1 r^2 + a_2 r^4 + a_3 r^6 + a_4 r^8 + a_5 r^{10} + a_6 r^{12} \cdots$$

where:

z is the surface sag;

c=1/R, where R is the curvature radius of the surface's optical center;

k is the conic constant;

r is the distance from the optical axis; and $a_1, a_2, a_3, a_4, a_5$, and $a_6$ are the aspheric coefficients; and surface data for the aspheric lenses are as follows:

| Description | $a_1$ | $a_2$ | $a_3$ | $a_4$ | $a_5$ |
|---|---|---|---|---|---|
| First surface | 0 | −0.0030892391 | −0.0071110815 | 0.0011161245 | −0.0037678149 |
| Second surface | 0 | −0.025799536 | −0.022383266 | −0.012802254 | −0.0015873624 |
| Third surface | 0 | −0.0032416416 | 0.047130855 | −0.0040239483 | 0.0080725451 |
| Fourth surface | 0 | 0.035851620 | 0.032241911 | 0.0048140776 | 0.0044346914 |
| Fifth surface | 0 | −0.012922311 | 0.0014449276 | −0.00006741227 | −0.0000010470078 |
| Sixth surface | 0 | −0.02613585 | 0.0012729715 | −0.000049252884 | −0.0000016094932. |

13. The module for the digital camera as claimed in claim 12, wherein the module has a composite length of less than about 8 mm.

14. A wide angle lens having an optical axis, the wide angle lens comprising, in order from an object side:

a first positive convex lens element defining:

a first convex aspheric surface on the object side; and a second aspheric surface approximating a plane;

a second concavo-convex negative lens defining:
  a third concave aspheric surface on the object side; and
  a fourth convex aspheric surface; and a third lens element defining:
  a fifth high-aperture convex aspheric surface on the object side; and
  a sixth aspheric surface being wave-shaped;
wherein, each of the lens elements is disposed approximately symmetrically about an optical axis of the lens, and the lens elements statisfy the following data:

| Description   | R         | d         | D        | k |
|---------------|-----------|-----------|----------|---|
| First surface | 2.184347  | 0.8588545 | 1.910503 | 0 |
| Second surface| 10.81372  | 0.7662999 | 2.074914 | 0 |
| Third surface | −1.22888  | 0.749922  | 2.074216 | 0 |
| Fourth surface| −1.500726 | 0.5489361 | 2.736669 | 0 |
| Fifth surface | 5.441956  | 1.257498  | 5.240696 | 0 |
| Sixth surface | 4.590265  | 0.8093014 | 5.700535 | 0 | where:
  R is the curvature radius of the surface's optical center;
  d is the thickness of the lens element or space between surfaces of two adjacent lens elements;
  D is the effective aperture of the surface; and
  k is the conic constant,
wherein the conic constant and the aspheric surfaces of the lens are defined by the equation:

$$z = \frac{cr^2}{1+\sqrt{1-(1+k)c^2r^2}} + a_1r^2 + a_2r^4 + a_3r^6 + a_4r^8 + a_5r^{10} + a_6r^{12}\dots$$

where:
  z is the surface sag;
  c=1/R where R is the curvature radius of the surface's optical center; k is the conic constant;
  r is the distance from the optical axis; and
  $a_1, a_2, a_3, a_4, a_5,$ and $a_6$ are the as aspheric coefficients; and
surface data for the aspheric lenses are as follows:

| Description    | $a_1$ | $a_2$         | $a_3$         | $a_4$          | $a_5$           |
|----------------|-------|---------------|---------------|----------------|-----------------|
| First surface  | 0     | −0.0030892391 | −0.0071110815 | 0.0011161245   | −0.0037678149   |
| Second surface | 0     | −0.025799536  | −0.022383266  | −0.012802254   | −0.0015873624   |
| Third surface  | 0     | −0.0032416416 | 0.047130855   | −0.0040239483  | 0.0080725451    |
| Fourth surface | 0     | 0.03585162    | 0.032241911   | 0.0048140776   | 0.0044346914    |
| Fifth surface  | 0     | −0.012922311  | 0.0014449276  | −0.00006741227 | −0.0000010470078|
| Sixth surface  | 0     | −0.02613585   | 0.0012729715  | −0.000049252884| −0.0000016094932.|

15. The wide angle lens as claimed in claim 14, wherein at least one of the following three sets of conditions is met:

a refractive index 'n' and a dispersion coefficient 'v' of the first lens element respectively satisfy the following requirements: 1.55<n<1.7, 50<v<60;

a refractive index 'n' and a dispersion coefficient 'v' of the second lens element respectively satisfy the following requirements: 1.58<n<1.6, 29<v<35; and a refractive index 'n' and a dispersion coefficient 'v' of the third lens element respectively satisfy the following requirements: 1.49<n<1.55, 55<v<60.

16. The wide angle lens as claimed in claim 14, wherein all of the following conditions are met:

a refractive index 'n' and a dispersion coefficient 'v' of the first lens element respectively satisfy the following requirements: 1.55<n<1.7, 50<v<60;

a refractive index 'n' and a dispersion coefficient 'v' of the second lens element respectively satisfy the following requirements: 1.58<n<1.6, 29<v<35; and a refractive index 'n' and a dispersion coefficient 'v' of the third lens element respectively satisfy the following requirements: 1.49<n<1.55, 55<v<60.

* * * * *